C. ALVORD

METHOD OF AND APPARATUS FOR MANUFACTURING TUFT YARN FRAMES

July 25, 1933. Re. 18,903

Original Filed Aug. 11, 1930 2 Sheets-Sheet 1

INVENTOR
Clinton Alvord
BY
Heard Smith & Tennant.
ATTORNEYS

C. ALVORD

METHOD OF AND APPARATUS FOR MANUFACTURING TUFT YARN FRAMES

July 25, 1933. Re. 18,903

Original Filed Aug. 11, 1930 2 Sheets-Sheet 2

INVENTOR
Clinton Alvord
BY
Heard Smith & Tennant.
ATTORNEYS

Reissued July 25, 1933

Re. 18,903

UNITED STATES PATENT OFFICE

CLINTON ALVORD, OF WORCESTER, MASSACHUSETTS, ASSIGNOR TO WORCESTER LOOM WORKS, OF WORCESTER, MASSACHUSETTS, A CORPORATION OF MASSACHUSETTS

METHOD OF AND APPARATUS FOR MANUFACTURING TUFT YARN FRAMES

Original No. 1,851,798, dated March 29, 1932, Serial No. 474,332, filed August 11, 1930. Application for reissue filed April 29, 1933. Serial No. 668,648.

This invention relates to the manufacture of tuft yarn frames such as are employed in looms for weaving tufted pile carpets wherein the yarns are either withdrawn from the frames by grippers or the frames themselves are successively presented at the pile forming position.

The object of the invention is to provide a method and apparatus by which the yarn guides in tuft frames of all widths may be spaced with absolute accuracy and permanently secured as thus spaced in position on the frame.

A further object of the invention is to provide a method and apparatus for producing such tuft yarn frames rapidly and economically and at a minimum cost.

A further object of the invention is to provide a method and apparatus for producing tuft yarn frames of that type in which the yarn guides are provided with joints and in which the joints are permanently secured together so as to prevent the opening or spreading apart of the joints when the frames are threaded and in use.

These and other objects and features of the invention will appear more fully from the accompanying description and drawings and will be particularly pointed out in the claims.

As the general purpose and function of a tuft yarn frame for use in a loom for weaving tufted pile carpets is well known and familiar to those skilled in the art, and as various types of construction are adapted to be made by the method and apparatus of this invention, it will be sufficient here to illustrate and describe two types of such tuft yarn frames as typical. In the one type the yarn guides are formed as separate elements with overlapping joints and these elements are individually secured to the carrier bar of the frame, while in the other type the yarn guides are formed in a unitary series in a crimped strip of metal which as an entirety is secured to the carrier bar of the frame.

Whichever type of tuft yarn frame is employed, it is essential that the spacing of the yarn guides shall be regular, exact and equal throughout the length of the frame. Should this spacing vary even slightly, the yarn guiding elements would not properly penetrate between the warp yarns when the frame is dipped to insert the pile and the result would be a defect in the fabric or carpet being woven. These tuft yarn frames are often twelve or more feet in length and there is a very substantial number of yarn guides per inch depending upon the fineness of the weave. This invention enables such frames of any type and of any length to be formed with the yarn guides permanently and rigidly secured in position to the carrier bar or main element of the frame and with all the yarn guides accurately and equally spaced.

While soldering methods for securing the yarn guides in place have long been used, it has been practically impossible to secure uniform and accurate results because of the difference in temperatures to which the yarn guides and the gauges employed were raised and the unequal temperatures prevailing at the time the solder sets.

One important feature of the present invention resides in the employment of spacer means for positioning the yarn guides with respect to the carrier bar of the frame and in the raising of the entire ensemble to a uniform temperature sufficient to melt the solder and then the gradual lowering of the temperature of this entire ensemble to a point where the solder sets, thus ensuring that the spacing of the yarn guides is maintained throughout the entire operation and that there is no possibility of the yarn guides being secured to the carrier bar otherwise than in the required accurate and equal spacing.

Figure 6:
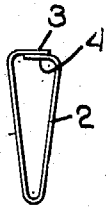
Fig. 6 is an enlarged end elevation of a single yarn guide having overlapping joints of the type shown in Figs. 2 and 4.

Referring particularly to the construction illustrated in Figs. 2, 4, 5, and 6, it will be seen that the yarn guide frame comprises a carrier bar 1 shown as a rigid, rectangular tube of metal, thus presenting great strength and rigidity, and a series of yarn guide tubes 2. Each of these yarn guides is of similar shape and is formed of sheet metal, usually tin plated, having overlapping longitudinal back edges, as shown in Fig. 6, where the back edge 3 overlaps the back edge 4. The ends of these overlapped back edges of the yarn guides overlie the carrier bar, as clearly shown in Fig. 2, and these overlapping edges are secured together and the yarn guides are secured to a carrier bar by solder so that, when the operation is completed, a firm and rigid unitary structure is presented.

Figure 5:
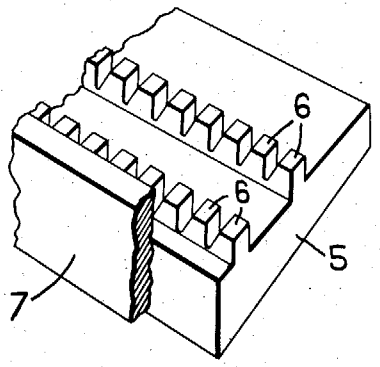
Fig. 5 is a fragmentary perspective view of a spacer such as employed in the construction shown in Figs. 2 and 4.

In order properly to space and position the yarn guides with respect to the carrier bar, there is provided, in accordance with this invention, a temporary yarn guide spacer, a section of which is shown in perspective in Fig. 5. This spacer is shown as a block 5 of metal of sufficient length to extend the length of the carrier bar and is provided with a plurality of rows of rigid spaced projections 6 and is so shaped that, when the yarn guides are inserted in the spaces between these projections, they will be properly spaced and assembled. Preferably also a plate 7 of metal extends along the front face of the block 5 against which the front ends of the yarn guides abut and are thus positioned longitudinally.

Figure 1:
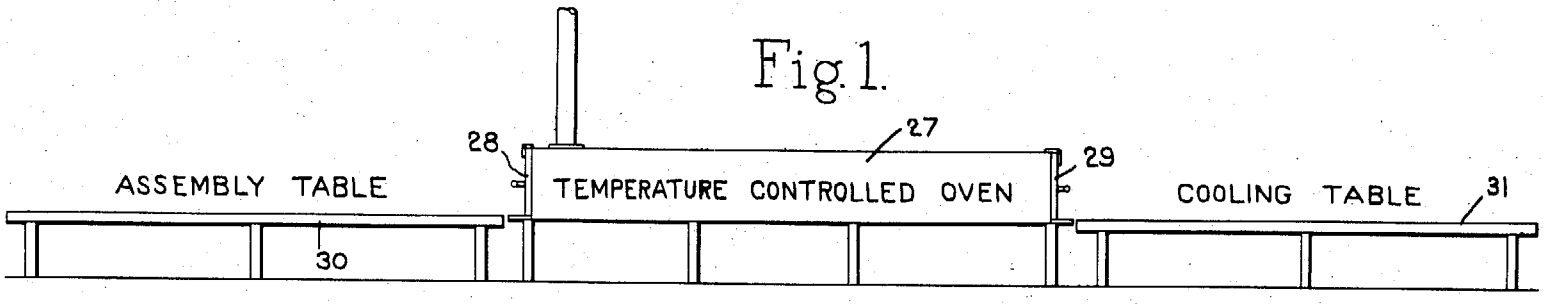
Fig. 1 is a diagrammatic elevation of a simple form of apparatus employed in carrying out the method of the invention.
Figure 4:
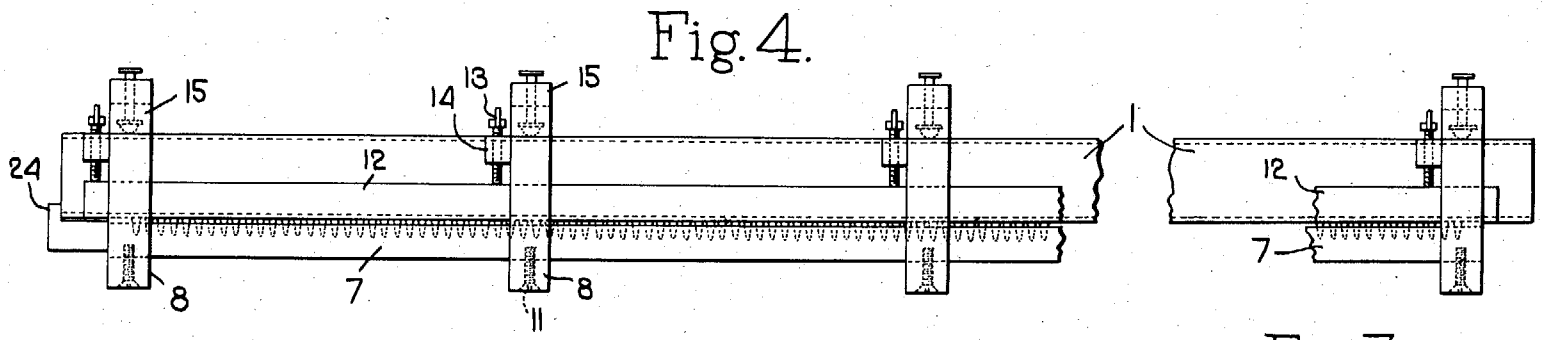
Fig. 4 is a front elevation partially broken away showing a plurality of the two-part separable holders with a complete tuft yarn frame of the first type in place therein.

A plurality of two-part separable holders is provided, the number of these holders depending upon the length of the frame or carrier bar. A preferred construction of such holder for use in forming a tubular yarn guide frame of the first type is shown in Figs. 1 and 4. Each holder forms a two-part separable clamp. One part 8 of the holder or clamp presents a flat base 9 and a flat seat 10 upon which the temporary spacer 5 and the plate 7 are seated. The spacer 5 is also secured to the holder or clamp part 8 by set screws 11, as shown.

When all the parts 8 of the holders or clamps are secured in position to the spacer and the plate 7 is in place, the tubular yarn guides 2 are positioned in the spaces between the projections 6 with the forward ends abutting the plate 7. A long retaining bar 12 is then placed on top of the entire series of tubular yarn guides and clamped down against the yarn guides by set screws 13, one such set screw being vertically threaded in a lug 14 projecting laterally from each holder part 8.

The second part of each holder is somewhat U-shaped, as shown at 15, and of a size sufficient to receive the carrier bar 1. One leg of this part of the holder or clamp fits in a suitable recess 16 of the lower holder part and is provided with a notch 17 engaged by a spring-pressed plunger 18 mounted in the lower holder part. The other leg is also provided with a notch 19 engaged by a similar spring-pressed plunger 20. A plunger 21 mounted vertically in the upper holder part is depressed by a spring 22 into engagement with the carrier bar.

The parts to be soldered are treated with a suitable flux. This is particularly important in the case of that portion of the overlapped back edges of the yarn guides projecting laterally from the carrier bar because the flux causes the solder applied at the end portions of the yarn guide to run substantially the full length of the yarn guides and insures the soldering together of substantially the entire length of the joint formed by the overlapped back edges. The flux may be conveniently applied to the tubular yarn guides 2 after the temporary spacer 5, the plate 7, and the yarn guides have been assembled in the lower holder part.

A sheet or strip of solder such as 23 is next laid on the ends of the back overlapping edges of the tubular yarn guides. The carrier bar 1 is then placed in the upper holder part 15 and this holder part is then placed in position on the lower holder part and the plungers 18 and 20 snap into position and lock the holder parts or clamps together. In this position the spring-pressed plungers 21 act yieldingly to press the row of positioned yarn guides and the carrier bar together with the strip or layer of solder 23 interposed between the ends of the overlapped back edges of the yarn guides and the front surface of the carrier bar. The left hand holder 5 is provided at one end with an upturned stop 24 to position the carrier bar longitudinally with respect to the tubular yarn guides. An abutting post 25 on each lower holder 5 extending up to a point slightly below the level of the top of the positioned yarn guides prevents the carrier bar from tipping while the parts are being assembled. When the assembly is completed, the spring-pressed plungers 21 hold the carrier bar in proper position clear of these posts 25. The holder or clamp parts are readily assembled by forcing the upper part down upon the lower part, causing the spring-pressed plungers 18 and 20, which are bevelled at their free ends, to spring into the notches 17 and 19, and the two holder or clamp parts are quickly detachable by pressing the plungers 18 and 19 inward by means of the handles 26.

The ensemble comprising a plurality of the two-part holders or clamps, the temporary spacer 5, the plate 7, the series of tubular yarn guides 2 mounted in the spacer, the strip of solder 23, and the carrier bar 1 all locked together is shown in Fig. 4.

This ensemble, in accordance with the method of this invention, is now as a whole raised in temperature to a point sufficient to melt the solder. Thus the entire ensemble maintains the same temperature and consequently there is no relative shifting or distortion of the parts. As the solder melts, the spring-pressed plungers 21 force the carrier bar and the positioned yarn guides together, thus causing not only the yarn guides and the carrier bar but the overlapped back edges of the yarn guides all thoroughly to be soldered or sweated together. The temperature of the entire ensemble is then gradually reduced to room temperature or to the point where the solder is set, the yielding pressure of the plungers 25 being maintained throughout. The operation is now complete and the clamps or holders are removed, together with the temporary spacer. The result is a tuft yarn frame in which all the tubular yarn guides are accurately and equally spaced and permanently and thoroughly secured in position to the carrier bar, and the overlapped back edges of the yarn guides are soldered together substantially for their full length.

A preferred form of apparatus for raising and lowering the temperature of the ensemble is shown somewhat diagrammatically in Fig. 1. It comprises an oven 27 of sufficient length and size to contain the entire ensemble. This oven may be heated by gas or other suitable means and is preferably provided with thermostatic means for maintaining it at a constant temperature of, say, about 445° F. Doors 28 and 29 are provided at the ends of the oven. An assembly table 30 is located at one end of the oven and a cooling table 31 at the other end. These tables present rigid, flat upper surfaces. The ensemble is preferably put together on the assembly table 30. When completed, the door 28 is opened and the ensemble is pushed into the oven. It then remains in the oven a sufficient length of time, say about thirty minutes, to enable all the parts of the ensemble to reach a uniform temperature above the melting point of the solder. The door 29 of the oven is then opened and the ensemble drawn out upon the cooling table 31 and left until the ensemble reaches room temperature and the solder sets. The rigid flat surface of the cooling table 31 insures that the tube frames shall not become warped while cooling. When the ensemble is removed from the oven, the operative makes sure that the carrier bar is against the stop 24 and, if it is not, taps the carrier bar with a hammer to bring it into this position.

Figure 3:
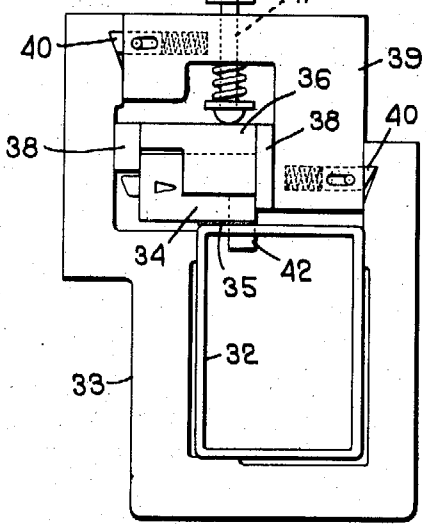
Fig. 3 is a view similar to Fig. 2 of another form of two-part separable holder with a tuft yarn frame of the second type in place therein.
Figure 2:
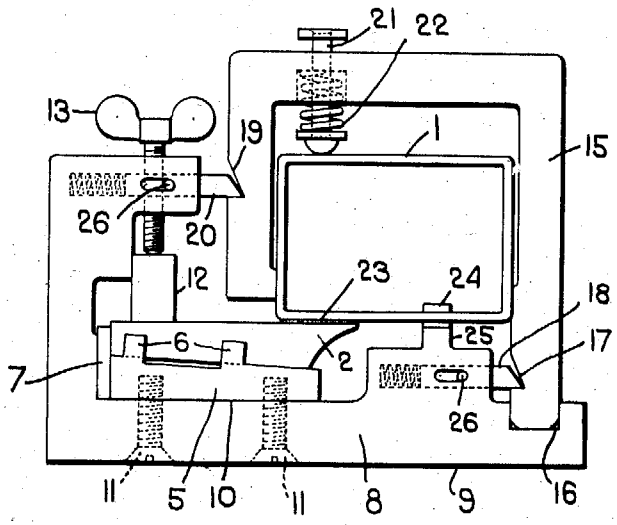
Fig. 2 is a view in end elevation of one of the two-part separable holders with a tuft yarn frame of the first type in place therein.
Figure 7:
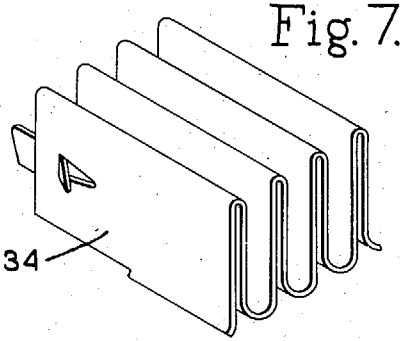
Fig. 7 is a perspective view of a portion of the yarn guide structure of the second type.
Figure 8:
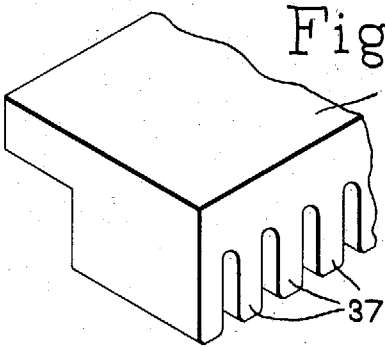
Fig. 8 is a fragmentary perspective view of a spacer such as employed in the construction shown in Fig. 3.

The process and apparatus employed in connection with the second type of tuft yarn frame is similar to that already described. As illustrative of this type, there is shown in Fig. 7 in perspective a portion of tuft frame such as disclosed in the patent to Alvord, No. 1,713,506, granted May 14, 1929. The only difference in this case is that the two-part separable holder or clamp is of a slightly different design to accommodate this type of tuft frame. One of the holders or clamps for this purpose is shown in Fig. 3. In this case the carrier bar 32 is seated in the lower holder part 33 which is of general U shape. The strip 34 forming the series of yarn guides is placed in position overlying the carrier bar with the strip 35 of solder interposed. The temporary spacer 36 is shaped as shown in Fig. 8 with the projections 37 adapted to fit in the spaces forming the yarn guides of the strip 34. This spacer is placed in position with a suitable end positioning plate 38. The upper holder part 39 is then placed in position and is provided with spring-pressed plungers 40 similar to those already described by which the two parts of the holder are detachably connected together. The spring-pressed plunger 41 in the upper holder member abuts the temporary spacer 36 and thus acts yieldingly to press the yarn guide strip and carrier bar with the interposed strip of solder together. A positioning lug 42 on the end of the temporary spacer 36 has the same function as the lug 24 already described.

After the parts have been assembled, the entire ensemble is then treated in the same manner as already described. The result is that the yarn guide strip 34 is permanently and rigidly secured to the carrier bar with the spaces forming the yarn guides all accurately and equally positioned.

There is thus presented a simple form of apparatus and method by means of which tuft yarn frames may be easily and economically manufactured and in which the yarn guides will be accurately and equally spaced throughout and rigidly and permanently secured in position.

Having thus described the invention, what is claimed as new, and desired to be secured by Letters Patent, is:

1. The process of forming a tuft yarn frame which comprises assembling a carrier bar, a plurality of yarn guides, and a temporary yarn guide spacer with the spacer accurately and uniformly positioning the yarn guides, with the ends of the backs of the positioned yarn guides overlying the carrier bar, and with a layer of solder interposed between the said yarn guides and the carrier bar, raising the temperature of the ensemble to a point sufficient to melt the solder, thereafter gradually cooling the ensemble to room temperature, maintaining a yielding pressure acting to force the yarn guides and carrier bar together while the temperature of the ensemble is being raised and while it is being lowered to a point where the solder is set, and removing the temporary spacer.

2. The process of forming a tuft yarn frame comprising the steps defined in claim 1, together with supporting the ensemble during the cooling step straight upon a rigid support.

3. The process of forming a tuft yarn frame which comprises assembling a carrier bar, a plurality of yarn guides, and a temporary yarn guide spacer with the spacer accurately and uniformly positioning the yarn guides, with the ends of the backs of the positioned yarn guides overlying the carrier bar, and with a layer of solder interposed between the said yarn guides and the carrier bar, placing the ensemble in an oven maintained at a temperature above the melting point of the solder, leaving the ensemble in the oven until it has reached the said temperature, thereafter gradually cooling the ensemble to room temperature, maintaining a yielding pressure acting to force the yarn guides and carrier bar together while the temperature of the ensemble is being raised and while it is being lowered to a point where the solder is set, and removing the temporary spacer.

4. The process of forming a tuft yarn frame comprising the steps defined in claim 3, together with supporting the ensemble during the cooling step straight upon a rigid support.

5. The process of forming a tuft yarn frame which comprises assembling a carrier bar, a plurality of tubular yarn guides each having overlapping longitudinal back edges, and a temporary yarn guide spacer with the spacer accurately and uniformly positioning the yarn guides, with the ends of the overlapped back edges of the positioned yarn guides overlying the carrier bar, and with a layer of solder interposed between the yarn guides and the carrier bar, raising the temperature of the ensemble to a point sufficient to melt the solder, thereafter gradually cooling the ensemble to room temperature, maintaining a yielding pressure acting to force the overlapping back edges of the yarn guides together and the yarn guides and carrier bar together while the temperature of the ensemble is being raised and while it is being lowered to a point where the solder is set, thus to effect a permanent union both between the overlapped edges of the yarn guides and between the yarn guides and the carrier bar and removing the temporary spacer.

6. The process of forming a tuft yarn frame comprising the steps defined in claim 5, together with supporting the ensemble during the cooling step straight upon a rigid support.

7. The process of forming a tuft yarn frame comprising the steps defined in claim 5, together with applying a flux to the overlapped back edges of the yarn guides whereby the solder interposed between the ends of the yarn guides and the carrier bar flows throughout substantially the length of the yarn guides and effects a permanent union between the overlapped edges of the yarn guides substantially throughout their length.

8. The process of forming a tuft yarn frame which comprises assembling a carrier bar, a plurality of tubular yarn guides each having overlapping longitudinal back edges, and a temporary yarn guide spacer with the spacer accurately and uniformly positioning the yarn guides, with the ends of the overlapped back edges of the positioned yarn guides overlying the carrier bar, and with a layer of solder interposed between the said yarn guides and the carrier bar, placing the ensemble in an oven maintained at a temperature above the melting point of the solder, leaving the ensemble in the oven until it has reached the said temperature, thereafter gradually cooling the ensemble to room temperature, maintaining a yielding pressure acting to force the overlapping back edges of the yarn guides together and the yarn guides and carrier bar together while the temperature of the ensemble is being raised and while it is being lowered to a point where the solder is set, thus to effect a permanent union both between the overlapped edges of the yarn guides and between the yarn guides and the carrier bar and removing the temporary spacer.

9. The process of forming a tuft yarn frame comprising the steps defined in claim 8, together with supporting the ensemble during the cooling step straight upon a rigid support.

10. The process of forming a tuft yarn frame comprising the steps defined in claim 8, together with applying a flux to the overlapped back edges of the yarn guides whereby the solder interposed between the ends of the yarn guides and the carrier bar flows throughout substantially the length of the yarn guides and effects a permanent union between the overlapped edges of the yarn guides substantially throughout their length.

11. An apparatus for forming a tuft yarn frame comprising a two-part separable holder, a yarn guide spacer mounted in one holder part to position accurately and uniformly tuft frame yarn guides in parallelism and in straight alignment, means in the other holder part to support removably a carrier bar with its front surface in juxtaposition to the ends of the backs of the positioned yarn guides and means on one holder part acting yieldingly to press the row of positioned yarn guides and carrier bar together when the holder parts are assembled.

12. An apparatus for forming a tuft yarn frame comprising the construction defined in claim 11, together with cooperating locking means on the holder parts for locking them together in assembled position.

13. An apparatus for forming a tuft yarn frame comprising the construction defined in claim 11, together with cooperating, spring-actuated, locking means on the holder parts for locking them together in assembled position.

14. An apparatus for forming a tuft yarn frame comprising a series of similar two-part, separable, transversely spaced clamps, a long rigid spacer extending transversely of and mounted in one part of each clamp to position accurately and uniformly tuft frame yarn guides in parallelism and in straight alignment, aligned means in the other part of each clamp to support removably a carrier bar with its front surface in juxtaposition to the ends of the backs of the positioned yarn guides, and means on each clamp acting yieldingly to press the row of positioned yarn guides and carrier bar together when the apparatus is assembled with the yarn guides and carrier bar therein.

15. The process of forming a tuft yarn frame which comprises assembling a carrier bar, a plurality of yarn guides, and a temporary yarn guide spacer with the spacer accurately and uniformly positioning the yarn guides, with the ends of the backs of the positioned yarn guides overlying the carrier bar, and with a strip of solder positioned in proximity to the said yarn guides and the carrier bar, raising the temperature of the ensemble to a point sufficient to melt the solder, thereafter lowering the temperature of the ensemble to a point where the solder is set, and removing the temporary spacer.

16. The process of forming a tuft yarn frame comprising the steps defined in claim 15, together with supporting the ensemble during the step of lowering the temperature straight upon a rigid support.

17. The process of forming a tuft yarn frame which comprises assembling a carrier bar, a plurality of tubular yarn guides each having overlapping longitudinal back edges and a temporary yarn guide spacer with the spacer accurately and uniformly positioning the yarn guides, with the ends of the overlapped back edges of the positioned yarn guides overlying the carrier bar, and with a strip of solder positioned in proximity to the yarn guides and the carrier bar, raising the temperature of the ensemble to a point sufficient to melt the solder, thereafter lowering the temperature of the ensemble to a point where the solder is set to effect a permanent union both between the overlapped edges of the yarn guides and between the yarn guides and the carrier bar, and removing the temporary spacer.

CLINTON ALVORD.